United States Patent
Amano et al.

(10) Patent No.: US 10,997,612 B2
(45) Date of Patent: May 4, 2021

(54) ESTIMATION MODEL FOR ESTIMATING AN ATTRIBUTE OF AN UNKNOWN CUSTOMER

(71) Applicant: International Business Machines Corporation, Armonk, NY (US)

(72) Inventors: Shunichi Amano, Tokyo (JP); Kohichi Kamijoh, Tokyo (JP); Ryo Kawahara, Tokyo (JP); Masaki Ono, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 14/974,565

(22) Filed: Dec. 18, 2015

(65) Prior Publication Data
US 2016/0180355 A1 Jun. 23, 2016

(30) Foreign Application Priority Data
Dec. 19, 2014 (JP) .............................. JP2014-257190

(51) Int. Cl.
*G06Q 30/02* (2012.01)
*G06Q 10/00* (2012.01)

(52) U.S. Cl.
CPC ..... *G06Q 30/0201* (2013.01); *G06Q 30/0204* (2013.01)

(58) Field of Classification Search
CPC . G06Q 30/0201; G06Q 30/277; G06Q 30/204
(Continued)

(56) References Cited

U.S. PATENT DOCUMENTS 7,519,553 B2 * 4/2009 Abe .................. G06Q 40/00
705/30
8,396,737 B2 * 3/2013 Lakshminarayan ..............
G06Q 10/0639
705/7.29
(Continued)

FOREIGN PATENT DOCUMENTS

JP 2010517473 5/2010
JP 2011520161 7/2011
(Continued)

OTHER PUBLICATIONS

Belkin, M., et al., "Regularization and Semi-supervised Learning on Large Graphs", Colt, Jul. 2004, pp. 1-15, vol. 3120.
(Continued)

*Primary Examiner* — David J Stoltenberg
*Assistant Examiner* — Michael I Ezewoko
(74) *Attorney, Agent, or Firm* — Fleit Intellectual Property Law; Jon Gibbons

(57) ABSTRACT

There is provided a generating apparatus that generates an estimation model for estimating an attribute of an unknown target, the generating apparatus including a training-data acquiring unit acquiring training data including an attribute of a known target, attributes of other targets related to the known target, and a plurality of sets of types of relations between the known target and the other targets and a training processing unit training, using the training data, on the basis of the attribute of the known target and a type of a relation between the known target and the unknown target related to the known target, an estimation model for estimating the attribute of the unknown target, a generating method using the generating apparatus, and a program used in the generating apparatus.

13 Claims, 7 Drawing Sheets

(58) Field of Classification Search
USPC .......................................................... 705/7.31
See application file for complete search history.

(56) References Cited

U.S. PATENT DOCUMENTS

| | | | | |
|---|---|---|---|---|
| 2012/0166452 | A1* | 6/2012 | Tseng | H04L 65/40 |
| | | | | 707/749 |
| 2012/0323674 | A1* | 12/2012 | Simmons | G06Q 30/02 |
| | | | | 705/14.41 |
| 2016/0148251 | A1* | 5/2016 | Thomas | G06N 3/006 |
| | | | | 705/14.43 |

FOREIGN PATENT DOCUMENTS

| | | |
|---|---|---|
| JP | 2012509519 | 4/2012 |
| JP | 5124680 | 1/2013 |
| JP | 2013114568 | 6/2013 |
| JP | 2013218579 | 10/2013 |
| JP | 2013242676 | 12/2013 |

OTHER PUBLICATIONS

Kondor, R., et al., "Diffusion Kernels on Graphs and Other Discrete Structures", Proceedings of the 19th International Conference on Machine Learning, Jul. 8-12, 2002 pp. 1-8.

Pennacchiotti, M. et al., "Democrats, Republicans and Starbucks Afficionados: User Classification in Twitter", Proceedings of the 17th ACM SIGKDD International Conference on Knowledge Discovery and Data Mining, Aug. 21-24, 2011, pp. 1-9.

Prithviraj, S., et al., "Collective Classification in Network Data", 2014 IEEE Symposium on Computational Intelligence and Data Mining, Dec. 9-12, 2014 pp. 1-24.

* cited by examiner

[Figure 2]
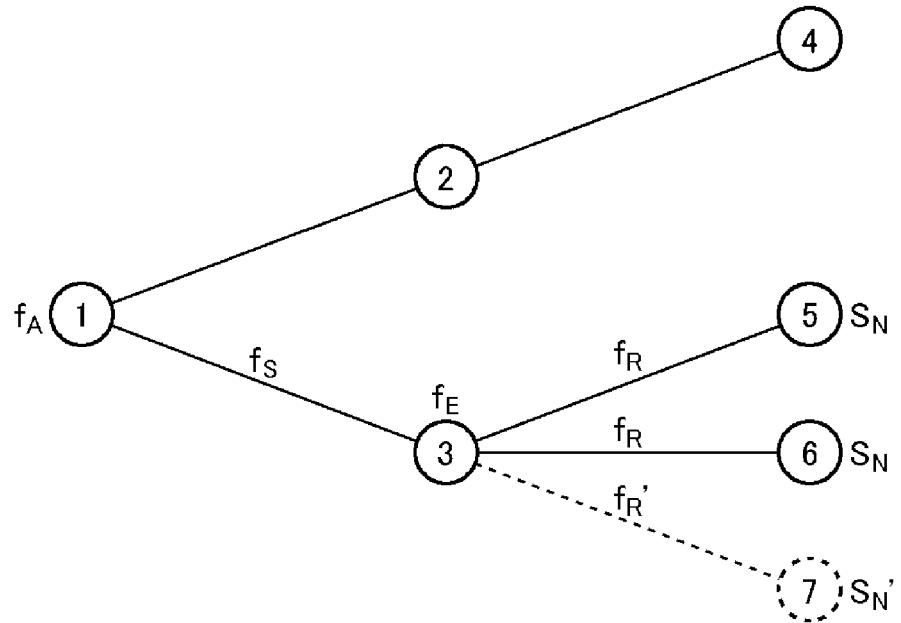
[Figure 3]
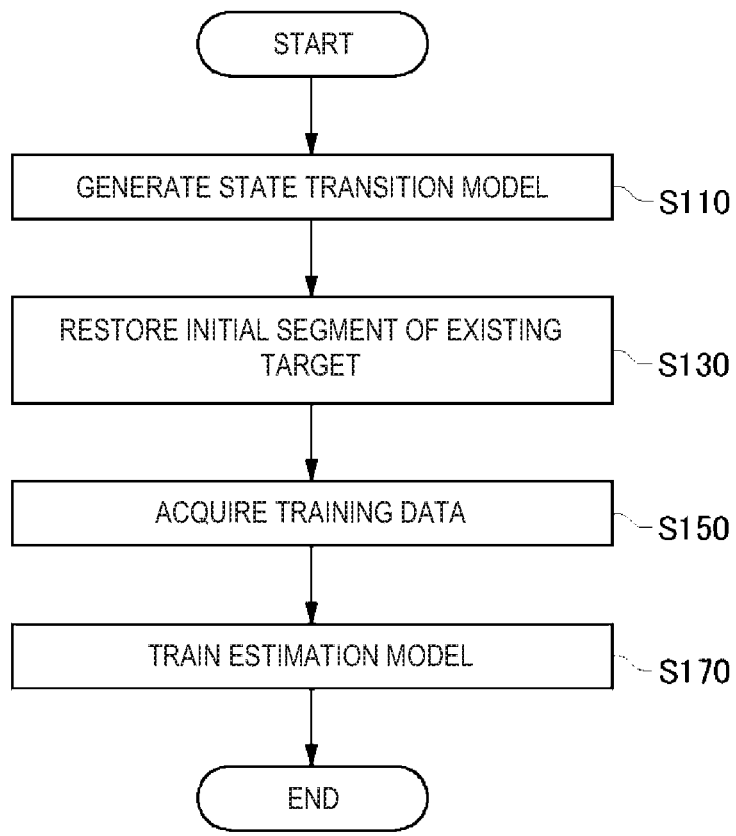

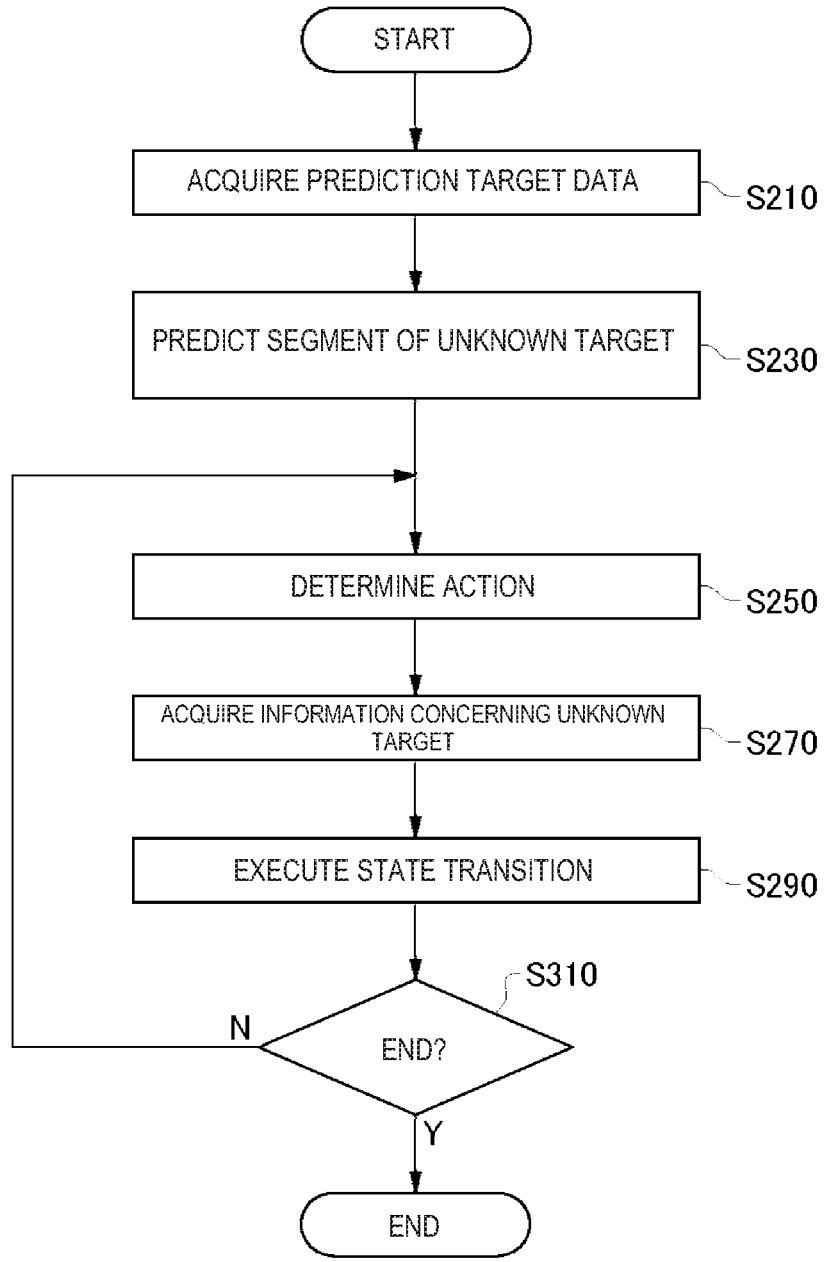

[Figure 5]
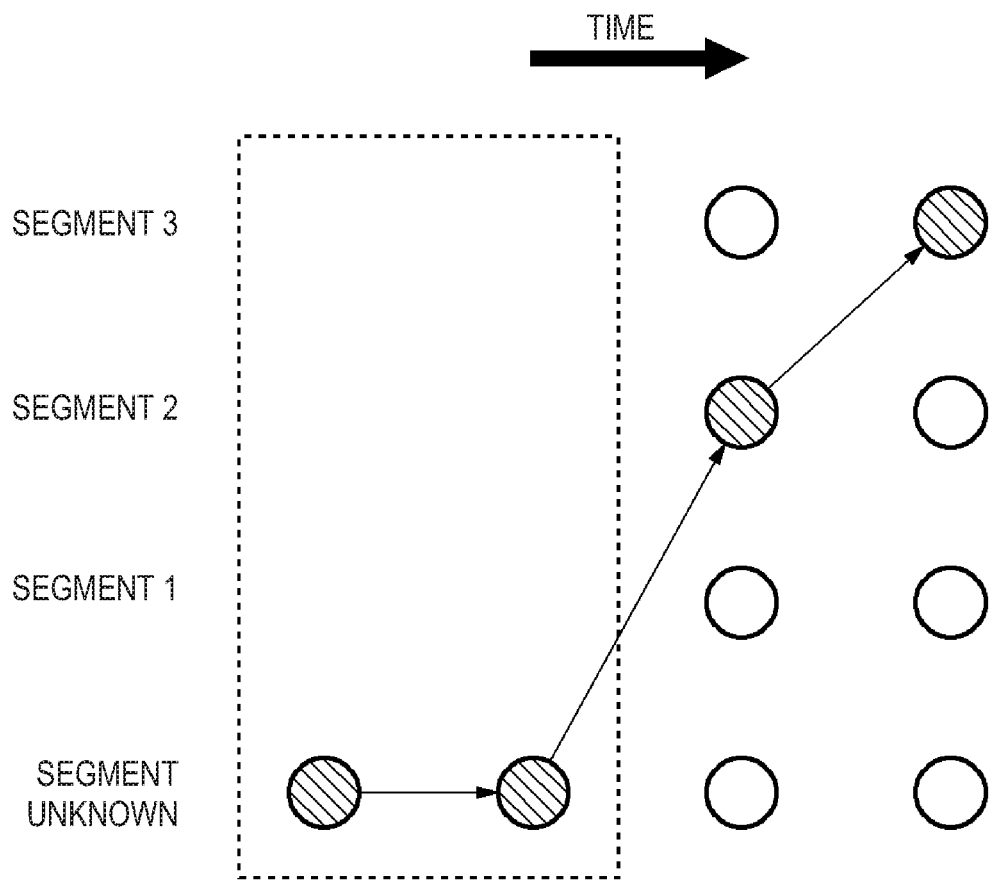

[Figure 6]
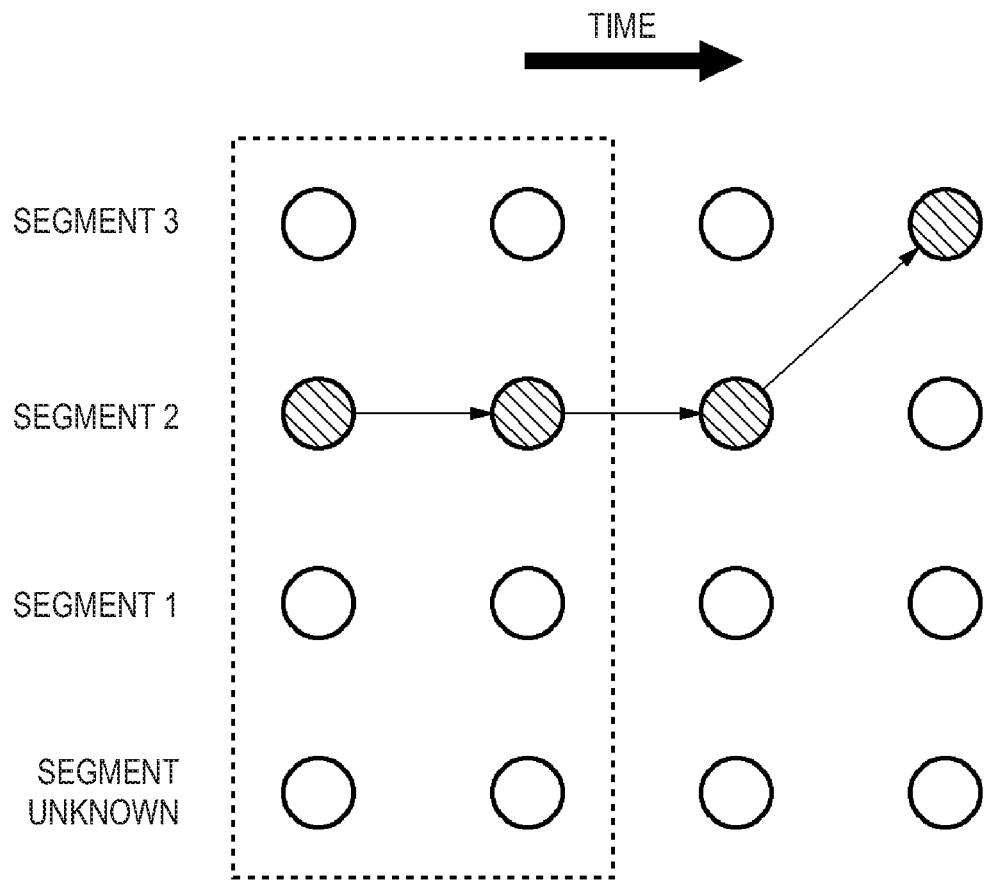
[Figure 7]
|  | WITH EXISTING CONTRACT | WITHOUT EXISTING CONTRACT |
| --- | --- | --- |
| INCOME EQUAL TO OR HIGHER THAN THRESHOLD INCOME | SEGMENT S1 | SEGMENT S2 |
| INCOME LOWER THAN THRESHOLD INCOME | SEGMENT S3 | SEGMENT S4 |

[Figure 8]

|  | EQUAL TO OR HIGHER THAN THRESHOLD FREQUENCY | LOWER THAN THRESHOLD FREQUENCY |
|---|---|---|
| USED RECENTLY | SEGMENT S1 | SEGMENT S2 |
| NOT USED RECENTLY | SEGMENT S3 | SEGMENT S4 |

[Figure 9]

|  | AGE 40'S OR HIGHER | AGE LOWER THAN 40'S |
|---|---|---|
| INCOME EQUAL TO OR HIGHER THAN THRESHOLD INCOME | SEGMENT S1<br>40% | SEGMENT S2<br>20% |
| INCOME LOWER THAN THRESHOLD INCOME | SEGMENT S3<br>10% | SEGMENT S4<br>30% |

[Figure 10]

|  | AGE 40'S OR HIGHER | AGE LOWER THAN 40'S |
|---|---|---|
| INCOME EQUAL TO OR HIGHER THAN THRESHOLD INCOME | SEGMENT S1<br>80% | SEGMENT S2<br>0% |
| INCOME LOWER THAN THRESHOLD INCOME | SEGMENT S3<br>20% | SEGMENT S4<br>0% |

ESTIMATION MODEL FOR ESTIMATING AN ATTRIBUTE OF AN UNKNOWN CUSTOMER

CROSS-REFERENCE TO RELATED APPLICATIONS

This application is based upon and claims priority from Japanese Patent Application Number 2014-257190, filed on Dec. 19, 2014, the entire disclosure of each application is incorporated by reference in its entirety.

BACKGROUND

The present invention generally relates to marketing, and more specifically to target marketing for a new customer.

In sales and marketing activities, there has been known a method of specifying a segment to which a target such as a customer belongs and performing optimum approach to the target through a Markov decision process or the like according to the specified segment. However, since information concerning an unknown target such as a new customer is little, it cannot be sufficiently specified, in an initial stage of sales activities, to which segment a customer belongs. The optimum approach cannot be taken.

In particular, in many cases, a new customer is introduced by an existing customer. Since both the customers are acquaintances each other, improvement of an approach to the new customer is desired because a bad approach is likely to affect the existing customer as well.

Therefore, there has been known a method of estimating, on the basis of information concerning a known target related to an unknown target, a segment to which the unknown target belongs (see Non-Patent Literatures 1 to 4 and Patent Literature 1). However, Non-Patent Literature 2 and Patent Literature 1 are based on the premise that text information written by the unknown target can be analyzed. The method cannot be applied to a new customer whose text information cannot be obtained. In Non-Patent Literatures 1, 3, and 4, a segment is estimated on the basis of similarity and correlation between targets adjacent to each other. However, since an introducing customer and an introduced customer often do not belong to similar segments, a sufficient result cannot be obtained.

SUMMARY

However, since information concerning an unknown target such as a new customer is little, it cannot be sufficiently specified, in an initial stage of sales activities, to which segment a customer belongs.

In a first aspect of the present invention, there is provided a generating apparatus that generates an estimation model for estimating an attribute of an unknown target, the generating apparatus including: a training-data acquiring unit acquiring training data including an attribute of a known target, attributes of other targets related to the known target, and a plurality of sets of types of relations between the known target and the other targets; and a training processing unit training, using the training data, on the basis of the attribute of the known target and a type of a relation between the known target and the unknown target related to the known target, an estimation model for estimating the attribute of the unknown target, a generating method using the generating apparatus, and a program used in the generating apparatus.

Note that the summary of invention does not enumerate all of features of the present invention. Sub-combinations of a group of these features could also be inventions.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 shows a relation among a plurality of targets in the embodiment;

FIG. 3 shows a processing flow during training of the generating apparatus 10 in the embodiment;

FIG. 4 shows a processing flow during transition model execution of the generating apparatus 10 in the embodiment;

FIG. 5 shows an example of a transition model in the case in which an initial segment is not estimated;

FIG. 6 shows an example of a transition model according to the embodiment;

FIG. 7 shows an example of segments to which a target belongs in the embodiment;

FIG. 8 shows another example of the segments in the embodiment;

FIG. 9 shows another example of the segments in the embodiment;

FIG. 10 shows an example of segment probabilities after being updated according to segmentation conditions.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention is described below through an embodiment of the invention. However, the following embodiment does not limit inventions according to claims. Not all of combinations of features described in the embodiment are always essential for the solution of the invention.

Figure 1:
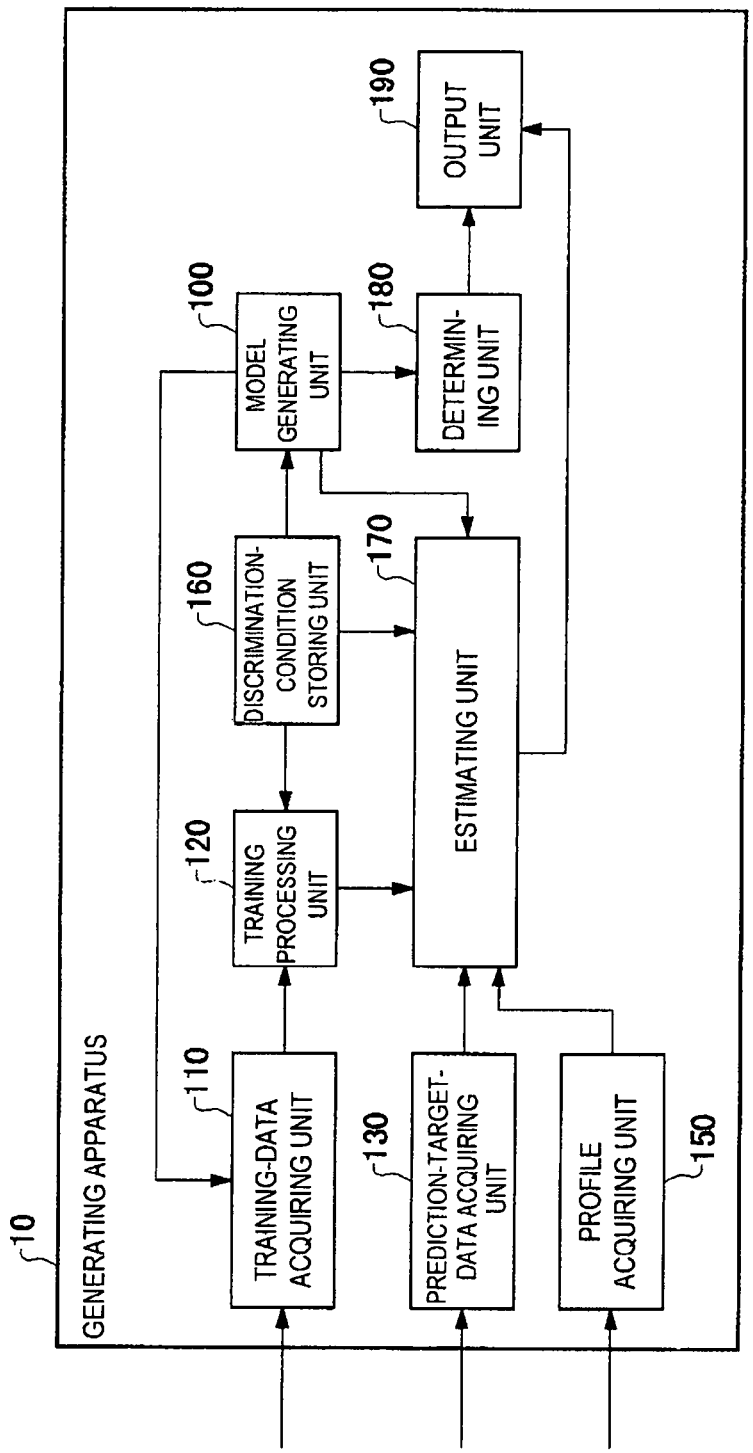
FIG. 1 shows a block diagram of a generating apparatus 10 in an embodiment.

FIG. 1 shows a block diagram of a generating apparatus 10 in this embodiment. The generating apparatus 10 generates, on the basis of training data of known targets, an estimation model for estimating attributes of an unknown target related to a known target. The "target" is an estimation target of an estimation model to be generated by the generating apparatus 10 and indicates, for example, a customer, a consumer, a subscriber, a member, and the like who purchase/use commodities/service and the like. The "attributes" are characteristics of the target and includes for example, profiles, which are detailed information of the target, and a segment indicating a state of the target.

The "known target" may be, for example, an existing customer who purchased a commodity or the like before and a paying member or a free member already subscribing for a service or the like. The "unknown target" may be a potential customer and may be, for example, a customer candidate or a member candidate before purchase/agreement.

For example, the generating apparatus 10 generates, on the basis of training data including profiles of an existing customer, an estimation model for estimating a segment that indicates a state such as a purchase desire or the like of an unknown customer. The generating apparatus 10 includes a model generating unit 100, a training-data acquiring unit 110, a training processing unit 120, a prediction-target-data acquiring unit 130, a profile acquiring unit 150, a segmentation-condition storing unit 160, an estimating unit 170, a determining unit 180, and an output unit 190.

The model generating unit 100 generates a state transition model concerning a plurality of known targets and an optimum policy in the state transition model. For example, the model generating unit 100 generates, on the basis of a transaction record (e.g., a purchase history) of a known target, a transition model of transition of a target among a plurality of segments decided in advance and an optimum policy for maximizing a reward obtained from the target. As an example, the model generating unit 100 generates a transition model or the like based on a partial observation Markov decision process (POMDP). The model generating unit 100 supplies the generated transition model to the estimating unit 170 and supplies the optimum policy to the determining unit 180.

The model generating unit 100 acquires attributes of the known target. For example, the model generating unit 100 acquires, as attributes of a target, profile information of the known target from the transaction record and/or restores a segment into which the target is classified first among a plurality of segments in the transition model and acquires the restored segment as an attribute. The model generating unit 100 supplies the transaction record and the attributes of the target to the training-data acquiring unit 110.

The training-data acquiring unit 110 acquires training data concerning the known target. For example, the training-data acquiring unit 110 acquires training data including attributes of the known target, attributes of known other targets related to the known target, and a plurality of sets of types of relations between the known target and the known other targets.

For example, the training-data acquiring unit 110 may acquire, as attributes of the known target, profiles of the known target from the transaction record and may acquire a segment, into which the known other targets should be classified, generated by the model generating unit 100. The training-data acquiring unit 110 may acquire, as attributes of the known other targets related to the known target, attributes of another customer introduced by a known customer, who is the known target.

Further, the training-data acquiring unit 110 may acquire, from the transaction record, training data further including attributes of an action entity that performs an action on the unknown target and/or relation state information of the known target with respect to the action entity. For example, the training-data acquiring unit 110 may acquire profiles of a sales representative, who is the action entity that performs sales activities for a customer, who is the unknown target, and/or a degree of satisfaction of the known customer with the sales representative. The training-data acquiring unit 110 supplies the acquired training data to the training processing unit 120.

The training processing unit 120 trains, using the training data, on the basis of the attributes of the known target and a type of a relation between the known target and the unknown target related to the known target, an estimation model for estimating attributes of the unknown target. For example, the training processing unit 120 trains, on the basis of the profiles of the known target and the type of the relation between the known target and the unknown target, an estimation model for estimating a segment into which the unknown target is classified.

The training processing unit 120 may train an estimation model further on the basis of the attributes of the action entity and/or the relation state information. The training processing unit 120 supplies the trained estimation model to the estimating unit 170. Content of specific processing by the training processing unit 120 is explained below.

The prediction-target-data acquiring unit 130 acquires, as prediction target data, information obtained in a first stage concerning the unknown target, the information being used for estimating first attributes of the unknown target. For example, the prediction-target-data acquiring unit 130 acquires prediction target data including the attributes of the known target related to the unknown target and the type of the relation between the unknown target and the known target. The prediction-target-data acquiring unit 130 supplies the acquired prediction target data to the estimating unit 170.

The profile acquiring unit 150 acquires information obtained a posteriori from the unknown target. For example, the profile acquiring unit 150 acquires at least a part of the profiles of the unknown target after the action entity performs an action on the unknown target. The profile acquiring unit 150 supplies the acquired profiles to the estimating unit 170.

The segmentation-condition storing unit 160 stores a plurality of segmentation conditions that profiles of targets classified into segments should satisfy. The segmentation-condition storing unit 160 supplies the segmentation conditions to the estimating unit 170.

The estimating unit 170 estimates a segment of the unknown target on the basis of application of the prediction target data including the profiles of the known target and the type of the relation between the known target and the unknown target related to the known target to the estimation model. For example, the estimating unit 170 calculates a probability that the unknown target belongs to each of the plurality of segments.

The estimating unit 170 executes a simulation based on a transition model concerning a target and estimates a segment to which the target belongs. For example, the estimating unit 170 executes the transition model based on the POMDP using, as an initial probability, the probability, which is calculated on the basis of the estimation model, that the unknown target belongs to each of the segments. The estimating unit 170 may acquire the action performed on the unknown target, input the action to the transition model, and update the probability that the unknown target belongs to each of the segments.

When a part of profiles of the unknown target are found and the segmentation conditions for discriminating a segment of a target are satisfied, the estimating unit 170 may update segment information of the unknown target. For example, when the profiles of the unknown target acquired from the profile acquiring unit 150 are found and a part of the segmentation conditions acquired from the segmentation-condition storing unit 160 are satisfied, the estimating unit 170 updates the probability that the unknown target belongs to each of the segments. The estimating unit 170 supplies, to the determining unit 180 and the output unit 190, the segment information concerning the segment to which the unknown target belongs.

The determining unit 180 inputs the segment information of the unknown target to the optimum policy and determines an optimum action that should be performed on the unknown target. Consequently, the determining unit 180 determines, on the basis of the optimum policy, according to the probability that the unknown target belongs to each of the plurality of segments, an optimum action for maximizing a total of rewards from the unknown target predicted to the future. The determining unit 180 supplies the determined optimum action on the unknown target to the output unit 190.

The output unit 190 outputs a processing result of the generating apparatus 10. For example, the output unit 190 displays, on a display or the like of the generating apparatus 10, the segment information of the unknown target obtained from the estimating unit 170 and/or the optimum action on the unknown target obtained from the determining unit 180.

In this way, the generating apparatus 10 estimates, on the basis of, for example, an estimation model trained from training data including a plurality of known targets in an introduction relation, a segment to which an unknown target introduced a new belongs. Consequently, even in a situation in which information concerning an unknown target is insufficient, the generating apparatus 10 can accurately estimate a segment of the unknown target taking into account, for example, a relation between a known target and a target.

The generating apparatus 10 generates a transition model of the POMDP or the like, sets an estimated segment of the unknown target as an initial segment in the transition model, and determines an action that should be performed on the unknown target. Consequently, the generating apparatus 10 can execute a more appropriate action on the unknown target from an initial stage.

FIG. 2 shows a relation among a plurality of targets in this embodiment. A node 1 in the figure indicates an action entity that performs an action. Nodes 2 to 7 indicate targets of the action. The action entity is, for example, a sales representative of a commodity and/or a service and executes, for example, sales activities such as sales, promotions, information provision, and communication to the targets as actions. In the figure, $f_A$ indicates attributes of the action entity and is, for example, profiles of the sales representative.

The node 2 and the node 3 are known targets that receive actions from the action entity of the node 1 and are, for example, known customers. In the figure, $f_S$ indicates relation state information of the known target with the action entity and is, for example, customer satisfaction of the known customer (the node 2) with the sales representative (the node 1). In the figure, $f_E$ indicates attributes of the known target and is, for example, profiles of the known customer.

The nodes 4 to 6 are the other known targets related to the known targets and are, for example, known introduced customers introduced from the known customers. As an example, the node 5 is a known introduced customer introduced to the sales representative of the node 1 from the known customer of the node 3. In the figure, $S_N$ indicates attributes of the known targets and is, for example, segments of the known customers. In the figure, $f_R$ indicates types of relations between the known target and the other target and is, for example, types of human relations.

The node 7 is an unknown target related to the known target and is, for example, an unknown introduced customer introduced from the known customer. As an example, the node 7 may be an unknown introduced customer introduced to the sales representative of the node 1 from the known customer of the node 3. In the figure, $f_R'$ indicates a type of a relation between the known target and the unknown target and $S_N'$ indicates attributes (e.g., a segment) of the unknown customer.

For example, the generating apparatus 10 in this embodiment learns correlations between (A) the attributes $f_E$ of the known customer (the node 3) of the sales representative (the node 1), (B) the relations $f_R$ between the known customer (the node 3) and the known introduced customers (the nodes 5 to 6), and (C) the attributes $S_N$ of the known introduced customers (the nodes 5 to 6) (relations between A and B and C) to estimate the attributes $S_N'$ to which the unknown introduced customer (the node 7) should belong in the POMDP when information concerning the relation $f_R'$ of the unknown introduced customer (the node 7) is obtained anew.

FIG. 3 shows a processing flow during training of the generating apparatus 10 in this embodiment. In this embodiment, the generating apparatus 10 trains an estimation model by executing processing in S110 to S170.

First, in S110, the model generating unit 100 generates a state transition model of a known target. For example, the model generating unit 100 acquires a transaction record in the past between an action entity and the known target and generates, from the transaction record, a transition model of a segment of a target based on the Markov decision process (MDP) or the partially observable Markov decision process (POMDP) and an optimum policy for maximizing a reward.

As an example, the model generating unit 100 acquires a transaction record including profiles of a customer, who is the known target, and time series records of actions (e.g., sales activities by telephone) performed on the customer by a sales representative, who is the action entity, and responses (e.g., purchases of commodities and the like or changes in interests in commodities) of the customer to the actions.

The model generating unit 100 generates, from the transaction record, a transition model based on the POMDP or the like for transitioning, according to an action, a probability that the customer belongs to each of segments. For example, the model generating unit 100 may generate a transition model using segments defined by a person. For example, the model generating unit 100 may create, with a statistical analysis tool, a regression tree model including profiles of the customer of the transition record as predictor variables and including responses such as accumulated purchases of the customer as objective variables and generate a transition model using a segment generated by a regression tree. The model generating unit 100 may acquire segmentation conditions for classifying a target into a segment from the segmentation-condition storing unit 160 when the model generating unit 100 creates the transition model.

Further, the model generating unit 100 generates an optimum policy for maximizing a reward (e.g., a purchase of a commodity and/or a service) from the customer up to a future point decided in advance in the transition model. For example, the model generating unit 100 generates an optimum policy according to dynamic programming. The model generating unit 100 supplies the generated transition model and the generated optimum policy to the estimating unit 170 and the determining unit 180.

Subsequently, in S130, the model generating unit 100 restores a first segment of each of targets in training data. For example, the model generating unit 100 acquires initial segment information concerning a segment to which each of the targets belongs first in the generated transition model. As an example, the model generating unit 100 acquires, as the initial segment information, a probability that the known target belongs to each of the segments in the POMDP.

Instead, the model generating unit 100 may acquire, as the initial segment information, a segment to which the known target is estimated to belong with a highest probability in the POMDP or the like. The model generating unit 100 supplies the segment of the target to the training-data acquiring unit 110.

Subsequently, in S150, the training-data acquiring unit 110 acquires training data including at least the attributes $f_E$ of the known target, the attributes $S_N$ of the other targets related to the known target, and a plurality of sets of the types $f_R$ of relations between the known target and the other targets. The training-data acquiring unit 110 may further acquire, as the training data, the attributes $f_A$ of the action entity and/or the relation state information $f_S$ of the known target with the action entity.

For example, the training-data acquiring unit 110 acquires profiles of the known target as the attributes $f_E$ of the known target. As an example, the training-data acquiring unit 110 may acquire, as the attributes $f_E$ of the known target, an age, an address, gender, height, weight, a family makeup, a place of birth, health information, an academic history, an occupational category, income, a purchase history, hobbies, tastes, and/or thoughts of the known customer. The training-data acquiring unit 110 may acquire, as the attributes $f_E$ of the known target, segment information that indicates into what kinds of customer layer the known customer is classified in sales measures.

For example, the training-data acquiring unit 110 acquires, as attributes $S_N$ of the other targets related to the known target, a segment of a known introduced customer introduced to the sales representative from the known customer. As an example, the training-data acquiring unit 110 acquires, as the attributes $S_N$ of the other targets, the segment information of the known target generated in S130.

For example, the training-data acquiring unit 110 may acquire, as the types $f_R$ of the relations between the known target and the other targets, training data including a type of a relation between the known customer and an introduced customer introduced from the known customer. As an example, the training-data acquiring unit 110 may acquire, as the types $f_R$ of the relations, information for identifying a workplace relation (e.g., superiors, subordinates, or colleagues), a family relation (parents, brothers, a spouse, children, relatives, or the like), a school relation (classmates, schoolmates, seniors, or teachers), a friend relation, and/or a relation on a social network service (friends, follows, followers, and the like).

The other targets may be targets introduced to the action entity by the known target as targets of actions. For example, the other targets may be new customers introduced to a sales representative, who is the action entity, by a customer or the like, who is the known target. Therefore, the training-data acquiring unit 110 may acquire, as the types of the relations between the known target and the other targets, types of relations (e.g., a colleague relation in a workplace) between the known customer and an introduced customer introduced from the known customer.

For example, the training-data acquiring unit 110 acquires, as the attributes $f_A$ of the action entity, profiles of the sales representative who sells a commodity/a service or the like to a target. As an example, the training-data acquiring unit 110 may acquire, as the profiles of the sales representative, an age, gender, years of service, commodity dealing experiences, sales achievement, presence or absence of qualifications, and/or characters of the sales representative.

The training-data acquiring unit 110 may acquire profiles of a plurality of sales representatives as the attributes $f_A$ of the action entity. For example, the training-data acquiring unit 110 may convert profile information of the plurality of sales representatives into fixed-length vectors according to Counting processing and acquire the vectors as the attributes $f_A$.

For example, the training-data acquiring unit 110 acquires, as the relation state information $f_S$ of the known target with the action entity, information representing satisfaction of the known customer with the sales representative. As an example, the training-data acquiring unit 110 acquires, as the relation state information $f_S$, vectors representing, for example, satisfaction with customer services, satisfaction with a service/a commodity, and/or satisfaction with aftercare. The training-data acquiring unit 110 may acquire the relation state information $f_S$ from, for example, a result of a questionnaire to the known customer.

The training-data acquiring unit 110 acquires, for each of the other targets related to the known target, a plurality of sets of feature values $g=(f_E, f_R, f_A, f_S)$ consisting of a set of information including the attributes $f_E$ of the known target, the types $f_R$ of the relations between the known target and the other targets, the attributes $f_A$ of the action entity, and/or the relation state information $f_S$ of the known target with the action entity and the attributes $S_N$ of the other targets related to the known target. The training-data acquiring unit 110 may discretize the feature values $g=(f_E, f_R, f_A, f_S)$. The training-data acquiring unit 110 supplies the acquired training data to the training processing unit 120.

Subsequently, in S170, the training processing unit 120 trains, using the training data concerning the known target, an estimation model for estimating the attributes $S_N'$ of the unknown target. For example, the training processing unit 120 trains, on the basis of the attributes $f_E$ of the known target and the type $f_R'$ of the relation between the known target and the unknown target, an estimation model for estimating the segment $S_N'$ into which the unknown target should be classified. The training processing unit 120 may train, on the basis of attributes of a known customer, who is the known target, attributes of other customers, who are the other targets related to the known customer, and types of relations between the known customer and the other customers disclosed to the action entity by the known customer at a point when the other customers are unknown, an estimation model for estimating a segment into which an unknown customer having the same type of a relation as the known customer should be classified. For example, the training processing unit 120 may train, on the basis of, for example, a type of a relation between the known customer and an introduced customer, who was the unknown target in the past, introduced from the known customer, an estimation model for estimating a segment into which a new introduced customer should be classified.

As an example, the training processing unit 120 trains, using the feature values $g=(f_A, f_S, f_E, f_R)$ of the known target and the segment $S_N$ of the other targets related to the known target as correct answers, a probability $P(S_N|g)$ that the segment $S_N$ is obtained in the feature values g. The training processing unit 120 trains an estimation model for outputting $s=\mathrm{argmax}\{S_N\}P(S_N|g)$ if a probability $\max\{S_N\}P(S_N|g)$ is equal to or larger than a threshold Ps set in advance as a segment s corresponding to the feature values g. The training processing unit 120 may train $P(S_N|g)$ according to a known supervised learning method and may use, for example, a Naive Bayes method.

For example, the training processing unit 120 may use, as the segment s, a segment classified according to the magnitude of interest of a target in a commodity, a service, or the like, an amount of knowledge of the target concerning the commodity, the service, or the like, wealth of the target, a purchase frequency in the past of the target, presence or absence of recent purchase of the target, gender of the target, an age bracket of the target, or the like. The training processing unit 120 may define a segment according to the segmentation conditions stored in the segmentation-condition storing unit 160. The training processing unit 120 supplies the trained estimation model to the estimating unit 170.

FIG. 4 shows a processing flow during transition model execution of the generating apparatus 10 in this embodiment. In this embodiment, the generating apparatus 10 executes the transition model according to processing in S210 to S310 and determines an optimum action on the unknown target.

The prediction-target-data acquiring unit 130 acquires, in the estimation model, prediction target data used for estimating a segment to which the unknown target, which is a target for predicting attributes, belongs. For example, the prediction-target-data acquiring unit 130 acquires prediction target data including the attribute $f_E$ of the known target related to the unknown target and the relation $f_R'$ between the unknown target and the known target.

As an example, the prediction-target-data acquiring unit 130 acquires profiles of a known customer who introduced an unknown customer, who is a prediction target of attributes, and prediction target data including a relation (e.g., colleagues in a workplace) between the known customer and the unknown customer. The prediction-target-data acquiring unit 130 may acquire a segment of the known customer at the present point or in the beginning instead of/in addition to the profiles of the known customer.

The prediction-target-data acquiring unit 130 may further acquire attributes and/or relation state information of the action entity as the prediction target data. For example, the prediction-target-data acquiring unit 130 may acquire, as the prediction target data, profiles of a sales representative who performs sales activities on the unknown customer and/or customer satisfaction of the known customer, who introduced the unknown customer, with the sales representative.

The prediction-target-data acquiring unit 130 may acquire the prediction target data from the training data. For example, the prediction-target-data acquiring unit 130 may acquire, from the training data, attributes of the known target, attributes of the action entity, and/or relation state information. The prediction-target-data acquiring unit 130 supplies the acquired prediction target data to the estimating unit 170.

Subsequently, in S230, the estimating unit 170 estimates, on the basis of application of the prediction target data to the estimation model, a segment to which the unknown target belongs. For example, the estimating unit 170 inputs the prediction target data g acquired in S210 to the trained estimation model to thereby calculate the probability $P(S_N|g)$ that the unknown target belongs to each of the plurality of segments $S_N$. The estimating unit 170 supplies information concerning the estimated segment of the unknown target to the determining unit 180 and the output unit 190.

The estimating unit 170 starts, on the basis of the calculated probability $P(S_N|g)$ that the unknown target belongs to each of the plurality of segments, a transition model of the MDP, the POMDP, and the like concerning the unknown target. For example, the estimating unit 170 may set the probability $P(S_N|g)$ as an initial probability, which is a probability that the unknown target belongs to each of the segments first in the POMDP. For example, in the MDP, the estimating unit 170 may set a segment having the largest probability $P(S_N|g)$ as the segment to which the unknown target belongs first.

Subsequently, in S250, the determining unit 180 determines, according to the present segment information of the unknown target, an action that should be performed on the unknown target. For example, the determining unit 180 determines, according to the probability that the unknown target belongs to each of the plurality of segments, on the basis of the optimum policy, an action for maximizing a reward for the next action obtained from the unknown target or a total of rewards predicted to a predetermined point in future.

As an example, the determining unit 180 inputs the present segment (in the first processing in S250, the initial segment) of the unknown customer to the optimum policy concerning the MDP or the POMDP and determines an action that should be performed on the unknown customer among actions on customers such as face-to-face sales activities, sales activities by telephone, and commodity introduction by mail. The determining unit 180 supplies the determined action on the unknown target to the output unit 190.

Subsequently, in S270, the profile acquiring unit 150 acquires content of the action performed on the unknown target and further acquires, as observation, information concerning the unknown target after the action is performed. For example, the profile acquiring unit 150 acquires information concerning an action performed on a customer, who is the unknown target, by a sales representative, who is the action entity, a result of the action, and a reaction of the customer. As an example, the profile acquiring unit 150 acquires information concerning an action actually performed on the customer by the sales representative, purchase of a commodity/a service purchased by the customer in response to the action, and/or a reaction (e.g., interested or not interested) of the customer to the commodity/service.

The profile acquiring unit 150 acquires at least a part of profiles of the unknown target. For example, the profile acquiring unit 150 acquires information (e.g., an age bracket and an occupation of the customer) directly or indirectly obtained from conversation with the customer, who is the unknown customer, by the sales representative. The profile acquiring unit 150 may acquire, as a part of the profiles, information concerning the profiles extracted from the reaction to the action from the unknown target. The profile acquiring unit 150 supplies the acquired profiles of the unknown target to the estimating unit 170.

Subsequently, in S290, the estimating unit 170 estimates a state transition of the unknown target. For example, the estimating unit 170 executes a simulation based on the transition model and estimates a probability that the unknown target belongs to each of the plurality of segments after the action is performed on the unknown target. For example, the estimating unit 170 sets, as a present state, a probability that the unknown target currently belongs to each of the segments (in the first processing in S290, the initial probability predicted in S230) in the transition model based on the MDP and the POMDP, sets, as an action input to the transition model, the action actually performed on the unknown target acquired in S270, and inputs, as observation, information concerning a reaction of the unknown target after the action, and generates a probability $P(S_N)$ that the unknown target belongs to each of the segments.

When a part of profiles of the unknown target is found and a part of the plurality of segmentation conditions for discriminating a segment of a target are satisfied, the estimating unit 170 may update segment information of the unknown target. For example, the estimating unit 170 acquires, from the segmentation-condition storing unit 160, a plurality of segmentation conditions associated with each of at least one segment and should be satisfied by profiles of a target classified into the segment.

The estimating unit 170 determines whether at least a part of the profiles of the unknown target acquired in S270 satisfies the determination conditions for each of the segments and updates, according to a determination result, the probability that the unknown target belongs to each of the segments.

For example, when the feature values g concerning the unknown target are obtained, a probability that a target belong to the segment S defined by segmentation conditions $C_1$ to $C_N$ is indicated by $P(S|g)$ of Expression 1.

$$P(S|g)=P(C_1,\ldots,C_N=\text{true}|g)$$

For example, when the feature values g concerning the unknown target are obtained, a probability that a target belong to the segment S defined by segmentation conditions $C_1$ to $C_N$ is indicated by $P(S|g)$ of Expression 1.

When it is found that the segmentation condition $C_1$ among the segmentation conditions $C_1$ to $C_N$ is satisfied, the probability that the target belongs to the segment S is indicated by $P(S|g, C_1=\text{true})$ of Expression 2.

$$P(S|g, C_1 = \text{true}) = \frac{P(S|g)}{P(C_1 = \text{true}|g)} \quad \text{[Expression 2]}$$

When it is found that n segmentation conditions $C_1$ to $C_n$ among the segmentation conditions $C_1$ to $C_N$ are satisfied, the probability that the target belongs to the segment S is indicated by $P(S|g, C_1, \ldots, C_n)$ of Expression 3 ("=true" is omitted)

$$P(S|g, C_1, \ldots, C_n) = \frac{P(S|g, C_1, \ldots, C_{n-1})}{P(C_n|g, C_1, \ldots, C_{n-1})} \quad \text{[Expression 3]}$$

The denominator (a marginal probability) of the right sides of Expressions 2 and 3 can be calculated by Expression 4.

$$P(C_n|g, C_1, \ldots, C_{n-1}) = \sum_{S'}^{i \le n, C_1 = \text{true}} P(S'|g, C_1, \ldots, C_{n-1}) \quad \text{[Expression 4]}$$

In this way, the estimating unit 170 may perform, in S290, update of a probability based on the determination by the segmentation conditions of the profiles of the unknown target in addition to the update of the probability based on the POMDP.

Subsequently, in S310, the estimating unit 170 determines whether the processing is ended. For example, the estimating unit 170 determines whether the unknown target belongs to a segment decided in advance or whether a reward obtained from the unknown target exceeds a threshold decided in advance. When the processing is not ended, the estimating unit 170 returns the processing to S250.

In this way, the generating apparatus 10 estimates a segment of the unknown target using the profiles of the known target and the relations between the known target and the other targets and executes the transition model of the POMDP or the like using the estimated segment as an initial condition. The generating apparatus 10 executes the transition model in a state in which an initial segment of a target is estimated. Therefore, it is possible to propose an appropriate action to the target, in particular, in an initial stage.

FIG. 5 shows an example of a transition model in the case in which an initial segment is not estimated. In FIG. 5, a transition model is executed while a segment to which the unknown target belongs first is not predicted. The transition model includes "segments 1 to 3", to any one of which a target belongs according to a state. Further, the transition model includes a segment of "segment unknown" to which a target, which is unknown to belong to which of the segments 1 to 3, belongs.

When a segment to which a target belongs first is not predicted, since a segment to which the target should belong in the beginning is unclear, as shown in the figure, the unknown target provisionally belongs to the "segment unknown". Thereafter, a segment to which the unknown target should belong is determined on the basis of observation obtained from an action performed on the target and the unknown target. In FIG. 5, it is determined that the target belongs to the segment 2 at a third step and determines that the target belongs to the segment 3 at a fourth step.

In the case shown in FIG. 5, in the beginning of the transition model, the unknown target is always arranged in the "segment unknown" irrespective of a segment to which the unknown target actually belongs. Therefore, it is determined that the same action is performed on the unknown target. Therefore, an optimum action cannot be performed on the unknown target.

FIG. 6 shows an example of a transition model according to this embodiment. In FIG. 6, the transition model is executed after a segment to which the unknown target belongs first is predicted. It is predicted that a segment to which a target belongs first is the segment 2. It is determined that the target belongs to the segment 2 at second to third steps and belongs to the segment 3 at a fourth step.

In the case shown in FIG. 6, in the beginning of the transition model, a segment to which the target actually belongs is estimated. Therefore, an optimum action can be performed on the unknown target from an initial stage. For example, in this embodiment, a state (a segment) of the unknown customer introduced from the known customer is known. Therefore, the sales representative can perform appropriate sales activities on the unknown customer from the initial stage.

FIG. 7 shows an example of segments to which a target belongs in this embodiment. As shown in the figure, the generating apparatus 10 may classify the target into any one of segments S1 to S4 according to presence/absence of an existing contract and according to whether an income is equal to or more than/less than a threshold income. For example, the generating apparatus 10 may classify a target having an existing contract and having an income equal to or more than the threshold income into the segment S1, classify a target not having an existing contract and having an income equal to or more than the threshold income into the segment S2, classify a target having an existing contract and having an income less than the threshold income into the segment S3, and classify a target not having an existing contract and having an income less than the threshold income into the segment S4.

FIG. 8 shows another example of the segments to which the target belongs in this embodiment. As shown in the figure, the generating apparatus 10 may classify the target into any one of the segments S1 to S4 according to whether a frequency of use of a service or the like is equal to or higher than/lower than a threshold frequency and according to whether the target recently uses/does not use the service or the like. For example, the generating apparatus 10 may classify a target that uses the service or the like at a frequency equal to or higher than the threshold frequency and uses the service or the like recently into the segment S1, classify a target that uses the service or the like at a frequency lower than the threshold frequency and uses the service or the like recently into the segment S2, classify a target that uses the service or the like at a frequency equal to or higher than the threshold frequency and does not use the service or the like recently into the segment S3, and classify a target that uses the service or the like at a frequency lower than the threshold frequency and does not use the service or the like recently into the segment 4.

FIG. 9 shows another example of the segments to which the target belongs in this embodiment. As shown in the figure, the generating apparatus 10 may classify the target into any one of the segments S1 to S4 according to whether the age of the target is fortieth or higher/lower and whether an income is equal to or higher than/lower than a threshold income. For example, the generating apparatus 10 may classify a target that uses the service or the like at a frequency equal to or higher than the threshold frequency and uses the service or the like recently into the segment S1, classify a target that uses the service or the like at a frequency lower than the threshold frequency and uses the service or the like recently into the segment S2, classify a target that uses the service or the like at a frequency equal to or higher than the threshold frequency and does not use the service or the like recently into the segment S3, and classify a target that uses the service or the like at a frequency lower than the threshold frequency and does not use the service or the like recently into the segment 4.

When the transition model based on the POMDP is executed, the estimating unit 170 estimates a probability that the target belongs to each of the segments S1 to S4. For example, as shown in the figure, the estimating unit 170 estimates that a probability that the unknown target belongs to the segment S1 is 40%, a probability that the unknown target belongs to the segment S2 is 20%, a probability that the unknown target belongs to the segment S3 is 10%, and a probability that the unknown target belongs to the segment S4 is 30%.

In FIG. 7 to FIG. 9, for example, it can be considered that a customer closer to the segment S1 is a more promising customer and a customer closer to the segment S4 is less promising customer. Therefore, for example, in S250, the determining unit 180 may determine, as the probability that the unknown target belongs to the segment S1 is higher, an action (e.g., face-to-face sales activities) in which costs are high but a high effect can be expected and determine, as the probability that the unknown target belongs to the segment S4 is higher, an action (e.g., sales activities by mail) in which costs and an effect are low.

In FIG. 7 to FIG. 9, an example is explained in which a segment is defined by a combination of two segmentation conditions. However, segments used by the generating apparatus 10 are not limited to this. For example, the generating apparatus 10 may use segments defined by one segmentation condition or combinations of three or more segmentation conditions.

FIG. 10 shows an example of segment probabilities after being updated according to segmentation conditions. For example, it is assumed that the generating apparatus 10 classifies a target into the segments S1 to S4 shown in FIG. 9. In S270, the generating apparatus 10 may acquire segmentation conditions for classifying the target into the segments S1 to S4. For example, the estimating unit 170 acquires, from the segmentation-condition storing unit 160, a segmentation condition "an age is forties or higher" and a segmentation condition "an income is equal to or higher than a threshold income".

In S270, the profile acquiring unit 150 sometimes acquires, concerning the unknown target, profiles related to the segmentation conditions. For example, it is assumed that the profile acquiring unit 150 acquires information "the age of a customer is at least forty" as a profile of the unknown target.

In this case, in S290, according to the acquired profile of the unknown target, the estimating unit 170 may determine that the unknown target satisfies the determination condition "an age is forties or higher". As a result, the probability that the unknown target belongs to each of the segments can be changed from a state shown in FIG. 9 to a state shown in FIG. 10.

When the segmentation condition that "an age is forties or higher" is satisfied, the target does not belong to the segment S2 and the segment S4, a requirement for which is "an age is forties or lower". Therefore, the estimating unit 170 may distribute, according to a ratio (40%:10%) of the probabilities of the segment S1 and the segment S3, a total (20%+30%) of the probabilities that the target belongs to the segment S2 and the segment S4. As a result, the estimating unit 170 may update the probability that the target belongs to the segment S1 to 80% and update the probability that the target belongs to the segment S3 to 20%.

In the explanation of this embodiment, an example is explained in which, in order to take an optimum action on the customer, who is the unknown target introduced from the known target, the sales representative of a commodity/a service or the like, who is the action entity, estimates a segment of the customer who purchases the commodity or the like. Specifically, the action entity may provide the known/unknown targets with insurances, banking, cosmetic products, automobiles, real estates, financial products, restaurants, salons, and/or human resource services such as headhunting.

In particular, the generating apparatus 10 in this embodiment may be used to estimate a segment of a new introduced customer in a commodity/a service or the like, purchase/use or the like of which is promoted by introduction among targets. In such a case, since there is a certain degree of a relation of trust/a relation of similarity or the like between the known target and the other targets/the unknown target, it is expected that there is a larger correlation among segments of both the targets. Therefore, the generating apparatus 10 can more accurately estimate a segment to which a target belongs.

For example, when a commodity/a service or the like is complicated and it is difficult to grasp needs of a customer, when the customer is not aware of needs, and/or when it is difficult to acquire profiles or the like of the customer or a risk is involved in acquiring the profiles or the like, the generating apparatus 10 in this embodiment can estimate a segment of the customer using a relation or the like among customers without taking a large risk.

Figure 11:
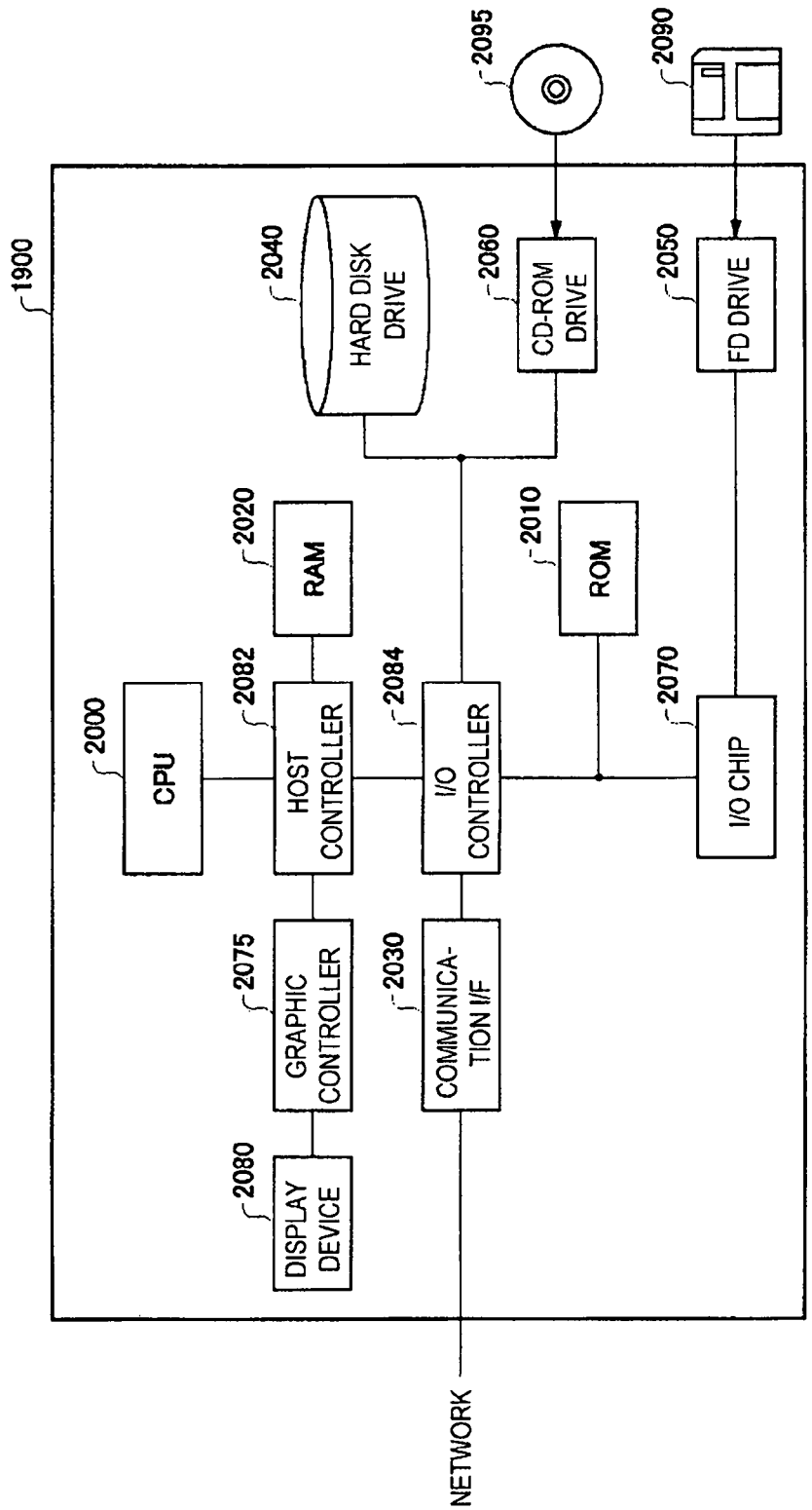
FIG. 11 shows an example of a hardware configuration of a computer 1900.

FIG. 11 shows an example of a hardware configuration of a computer 1900 functioning as the generating apparatus 10. The computer 1900 according to this embodiment includes a CPU peripheral section including a CPU 2000, a RAM 2020, a graphic controller 2075, and a display device 2080 connected to one another by a host controller 2082, an input and output section including a communication interface 2030, a hard disk drive 2040, and a CD-ROM drive 2060 connected to the host controller 2082 by an input and output controller 2084, and a legacy input and output section including a ROM 2010, a flexible disk drive 2050, and an input and output chip 2070 connected to the input and output controller 2084.

The host controller 2082 connects the RAM 2020 and the CPU 2000 and the graphic controller 2075 that access the RAM 2020 at a high transfer rate. The CPU 2000 operates on the basis of programs stored in the ROM 2010 and the RAM 2020 and performs control of the sections. The graphic controller 2075 acquires image data generated by the CPU 2000 or the like on a frame buffer provided in the RAM 2020 and causes the display device 2080 to display the image data. Instead, the graphic controller 2075 may include, on the inside, a frame buffer that stores image data generated by the CPU 2000 or the like.

The input and output controller 2084 connects the host controller 2082, the communication interface 2030, which is a relatively high-speed input and output device, the hard disk drive 2040, and the CD-ROM drive 2060. The communication interface 2030 communicates with other devices via a network by wire or by radio. The communication interface functions as hardware that performs communication. The hard disk drive 2040 stores programs and data used by the CPU 2000 in the computer 1900. The CD-ROM drive 2060 reads a program or data from a CD-ROM 2095 and provides the hard disk drive 2040 with the program or the data via the RAM 2020.

The ROM 2010, the flexible disk drive 2050, and a relatively low-speed input and output device of the input and output chip 2070 are connected to the input and output controller 2084. The ROM 2010 stores, for example, a boot program executed by the computer 1900 during start and/or a program relying on the hardware of the computer 1900. The flexible disk drive 2050 reads a program or data from a flexible disk 2090 and provides the hard disk drive 2040 with the program or the data via the RAM 2020. The input and output chip 2070 connects the flexible disk drive 2050 to the input and output controller 2084 and connects various input and output devices to the input and output controller 2084 via, for example, a parallel port, a serial port, a keyboard port, and a mouse port.

The program provided to the hard disk drive 2040 via the RAM 2020 is stored in a recording medium such as the flexible disk 2090, the CD-ROM 2095, or an IC card and provided by a user. The program is read out from the recording medium, installed in the hard disk drive 2040 in the computer 1900 via the RAM 2020, and executed in the CPU 2000.

Programs installed in the computer 1900 and causing the computer 1900 to function as the generating apparatus 10 include a model generating module, a training-data acquiring module, a training processing module, a prediction-target-data acquiring module, a profile acquiring module, a segmentation-condition storing module, an estimating module, a determining module, and an output module. These programs or modules may act on the CPU 2000 and the like and respectively cause the computer 1900 to function as the model generating unit 100, the training-data acquiring unit 110, the training processing unit 120, the prediction-target-data acquiring unit 130, the profile acquiring unit 150, the segmentation-condition storing unit 160, the estimating unit 170, the determining unit 180, and the output unit 190.

Information processing described in these programs is read by the computer 1900 to thereby function as the model generating unit 100, the training-data acquiring unit 110, the training processing unit 120, the prediction-target-data acquiring unit 130, the profile acquiring unit 150, the segmentation-condition storing unit 160, the estimating unit 170, the determining unit 180, and the output unit 190, which are specific means in which software and the various hardware resources explained above cooperate with each other. Calculation or processing of information corresponding to a purpose of use of the computer 1900 in this embodiment is realized by these specific means, whereby the peculiar generating apparatus 10 corresponding to the purpose of use is built.

As an example, when communication is performed between the computer 1900 and an external apparatus or the like, the CPU 2000 executes a communication program loaded on the RAM 2020 and instructs, on the basis of processing contents described in the communication program, the communication interface 2030 to perform communication processing. The communication interface 2030 is controlled by the CPU 2000, reads out transmission data stored in a transmission buffer region or the like provided on a storage device such as the RAM 2020, the hard disk drive 2040, the flexible disk 2090, or the CD-ROM 2095, and transmits the transmission data to a network or writes reception data received from the network in a reception buffer region or the like provided on the storage device. In this way, the communication interface 2030 may transfer the transmission and reception data to and from the storage device according to a DMA (direct memory access) system. Instead, the CPU 2000 may read out data from the storage device or the communication interface 2030 at a transfer source and write data in the communication interface 2030 or the storage device at the transfer destination to thereby transfer the transmission and reception data.

The CPU 2000 causes the RAM 2020 to read, through DMA transfer or the like, all or a necessary portion of a file, a database, or the like stored in an external storage device such as the hard disk drive 2040, the CD-ROM drive 2060 (the CD-ROM 2095), or the flexible disk drive 2050 (the flexible disk 2090) and applies various kinds of processing to data on the RAM 2020. The CPU 2000 writes back the data subjected to the processing to the external storage device through the DMA transfer or the like. In such processing, the RAM 2020 can be regarded as temporarily retaining contents of the external storage device. Therefore, in this embodiment, the RAM 2020, the external storage device, and the like are collectively referred to as memory, storing unit, storage device, or the like.

For example, the storing unit of the generating apparatus 10 may store, as appropriate, data received from/provided to the model generating unit 100, the training-data acquiring unit 110, the training processing unit 120, the prediction-target-data acquiring unit 130, the profile acquiring unit 150, the segmentation-condition storing unit 160, the estimating unit 170, the determining unit 180, and the output unit 190. For example, the storing unit may receive and store data of attributes of an existing target supplied to the training-data acquiring unit 110 by the model generating unit 100. The storing unit may store, for example, an estimation model trained by the training processing unit 120.

Various kinds of information such as various programs, data, tables, and databases in this embodiment are stored in such a storage device and serve as targets of information processing. Note that the CPU 2000 can also retain a part of the RAM 2020 in a cache memory and perform reading and writing on the cache memory. In such a form as well, since the cache memory plays a part of the function of the RAM 2020, in this embodiment, except when being distinguished and shown, the cache memory is also included in the RAM 2020, the memory, and/or the storage device.

The CPU 2000 applies, to data read out from the RAM 2020, various kinds of processing including the various kinds of calculation, the processing of information, the condition determination, and the retrieval and substitution of information described in this embodiment designated by a command sequence of a program and writes back the data to the RAM 2020. For example, when the condition determination is performed, the CPU 2000 determines whether the various variables described in this embodiment satisfy a condition that the variables are, for example, larger, smaller, equal to or larger than, or equal to or smaller than other variables or constants. When the condition holds (or does not hold), the CPU 2000 branches to a different command sequence or invokes a subroutine.

The CPU 2000 can retrieve information stored in the file, the database, or the like of the storage device. For example, when a plurality of entries in which attribute values of a second attribute are respectively associated with attribute values of a first attribute are stored in the storage device, the CPU 2000 can obtain an attribute value of the second attribute associated with the first attribute satisfying a predetermined condition by retrieving an entry in which an attribute value of the first attribute coincides with a designated condition out of the plurality of entries stored in the storage device and reading out an attribute value of the second attribute stored in the entry.

When a plurality of elements are enumerated in the explanation of the embodiments, elements other than the enumerated elements may be used. For example, when it is described "X executes Y using A, B, and C", X may execute Y using D in addition to A, B, and C.

The present invention is described above with reference to the embodiment. However, the technical scope of the present invention is not limited to the embodiment. It is evident for those skilled in the art that it is possible to add a variety of alterations or improvements to the embodiment. It is evident from the description of the claims that forms added with such alterations or improvements are also included in the technical scope of the present invention.

It should be noted that the execution order of the respective kinds of processing such as the operations, the procedures, the steps, and the stages in the apparatus, the system, the program, and the method described in the claims, the specification, and the drawings can be realized in any order unless "before", "prior to", and the like are clearly indicated in particular or an output of the preceding processing is used in the following processing. Even if the operation flows in the claims, the specification, and the drawings are described using "first", "subsequently", and the like for convenience, this does not mean that it is essential to carry out the operation flows in this order.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus that generates an estimation model for estimating an attribute of an unknown customer that is related to a known customer, the apparatus comprising:
 at least one hardware processor accessing memory to produce a trained estimation model by
  a) a training-data acquiring unit acquiring a first set of training data including an attribute of a known customer, attributes of other customers related to the known customer, and a plurality of sets of types of relations between the known customer and the other customers and a second set of training data including at least one segment the known customer is classified, wherein the segment is an indication of the known customer's purchase desire;
  b) a training processing unit training an estimation model for estimating the attribute of the unknown customer, using the first set of training data and the second set of training data, on a basis of the attribute of the known customer and a type of a relation between the known customer and the unknown customer and attributes of a sales representative and relation state information between the sales representative and the known customer;
  c) a segmentation-condition storing unit storing, in association with each of at least one segment, a plurality of segmentation conditions that are true in response to classifying the known customer into the at least one segment based on identifying at least one attribute of the unknown customer;
  d) a model generating unit generating a state transition model as a regression tree based on a plurality of the known customers and an optimum policy in the state transition model to maximize a reward from the unknown customer and supplying the second set of training data to the training-data acquiring unit;
 the at least one hardware processor accessing memory to execute the state transition model by
  e) an estimating unit estimating, using the state transition model, the trained estimation model, and the optimal policy, the at least one segment of the unknown customer on a basis of the attribute of the known customer and a type of a relation between the known customer and the unknown customer to calculate a probability that the unknown customer belongs to each of a plurality of segments, and updating the probability that the unknown customer belongs to each of the plurality of segments after a type of sales communication is performed on the unknown customer and repeating the estimating by the estimation unit until the reward is above a settable reward threshold or the probability that the unknown customer belongs to one of the plurality of segments is above a settable probability threshold;

f) a determining unit determining, based on the trained estimation model, and the optimum policy and according to a probability that the unknown customer belongs to each of the plurality of segments, a type of sales communication to be performed on the unknown customer by the sales representative, wherein the type of sales communication to be performed on the unknown customer by the sales representative is one of face-to-face sales activities, sales activities by telephone, and commodity introduction by mail; and g) an output unit outputting a processing result of the at least one segment of the unknown customer obtained from the estimating unit and the type of sales communication on the unknown customer obtained from the determining unit.

2. The apparatus according to claim 1, wherein the training-data acquiring unit acquires, as the attributes of the other known customers, segments into which the other known customers should be classified among a plurality of segments, and
the training processing unit trains the estimation model for estimating a segment into which the unknown customer should be classified.

3. The apparatus according to claim 2, wherein the training-data acquiring unit acquires a profile of the known customer as the attributes of the known customer.

4. The apparatus according to claim 1, wherein the training-data acquiring unit acquires the first set of training data further including an attribute of the sales representative that performs the type of sales communication, and
the training processing unit trains the estimation model further on a basis of the attribute of the sales representative.

5. The apparatus according to claim 4, wherein the training-data acquiring unit acquires the first set of training data further including relation state information of the known customer with the sales representative that performs the type of sales communication, and
the training processing unit trains the estimation model further on a basis of the relation state information.

6. The apparatus according to claim 1, further comprising a segmentation-condition storing unit storing, in association with each of at least one segment, a plurality of segmentation conditions that should be satisfied by a profile of a customer classified into the segment, wherein
on condition that a part of profiles of the unknown customer are found and a part of the plurality of segmentation conditions are satisfied, the estimating unit updates the probability that the unknown customer belongs to each of the segments.

7. The apparatus according to claim 4, wherein the training-data acquiring unit acquires first set of training data including an attribute of a known customer as the attribute of the known customer, including attributes of other customers related to the known customer as the attributes of the other customers, and including, as the plurality of sets of types of the relations between the known customer and the other known customers, types of relations between the known customer and the other customers disclosed to the action entity by the known customer at a point when the other customers are unknown, and
the training processing unit trains, on a basis of the attribute of the known customer, the attributes of the other customers, and the plurality of sets of types of the relations between the known customer and the other customers, the estimation model for estimating a segment into which the unknown customer having the type of the relation with the known customer should be classified.

8. The apparatus according to claim 1, wherein the training-data acquiring unit acquires, as the types of the relations between the known customer and the other known customers, the first set of training data including a type of a human relation.

9. A computer-implemented method for generating an estimation model for estimating an attribute of an unknown customer that is related to a known customer, the method comprising the steps of:
producing a trained estimation model by steps a through d
a) acquiring a first set of training data including an attribute of a known customer, attributes of other customers related to the known customer, and a plurality of sets of types of relations between the known customer and the other customers and a second set of training data including at least one segment the known customer is classified, wherein the segment is an indication of the known customer's purchase desire;
b) training an estimation model for estimating the attribute of the unknown customer, using the first set of training data and the second set of training data, on a basis of the attribute of the known customer and a type of a relation between the known customer and the unknown customer and attributes of a sales representative and relation state information between the sales representative and the known customer;
c) storing, in association with each of at least one segment, a plurality of segmentation conditions that are true in response to classifying the known customer into the at least one segment based on identifying at least one attribute of the unknown customer;
d) generating a state transition model as a regression tree based on a plurality of the known customers and an optimum policy in the state transition model to maximize a reward from the unknown customer and supplying the second set of training data to step a;
executing the state transition model by steps e through g
e) estimating, using the state transition model, the trained estimation model, and the optimal policy, the at least one segment of the unknown customer on a basis of the attribute of the known customer and a type of a relation between the known customer and the unknown customer to calculate a probability that the unknown customer belongs to each of a plurality of segments, and updating the probability that the unknown customer belongs to each of the plurality of segments after a type of sales communication is performed on the unknown customer and repeating the estimating by step e until the reward is above a settable reward threshold or the probability that the unknown customer belongs to one of the plurality of segments is above a settable probability threshold;

f) determining, based on the trained estimation model, and the optimum policy and according to a probability that the unknown customers belongs to each of the plurality of segments, a type of sales communication to be performed on the unknown customer by the sales representative, wherein the type of sales communication to be performed on the unknown customer by the sales representative is one of face-to-face sales activities, sales activities by telephone, and commodity introduction by mail; and g) outputting a processing result of the at least one segment of the unknown customer obtained from the step e and the type of sales communication on the unknown customer obtained from the determining.

10. The computer-implemented method according to claim 9, further comprising
acquiring, as the attributes of the other known customers, segments into which the other known customers should be classified among a plurality of segments, and
training the estimation model for estimating a segment into which the unknown customer should be classified.

11. The computer-implemented method according to claim 10, wherein the acquiring further includes acquiring a profile of the known customer as the attribute of the known customer.

12. A non-transitory computer program product for generating an estimation model for estimating an attribute of an unknown customer that is related to a known customer comprising a computer readable storage medium having computer readable program code embodied therewith, the computer readable program code configured to perform:
producing a trained estimation model by steps a through d
a) acquiring a first set of training data including an attribute of a known customer, attributes of other customers related to the known customer, and a plurality of sets of types of relations between the known customer and the other customers and a second set of training data including at least one segment the known customer is classified, wherein the segment is an indication of the known customer's purchase desire;
b) training an estimation model for estimating the attribute of the unknown customer, using the first set of training data and the second set of training data, on a basis of the attribute of the known customer and a type of a relation between the known customer and the unknown customer and attributes of a sales representative and relation state information between the sales representative and the known customer;
c) storing, in association with each of at least one segment, a plurality of segmentation conditions that are true in response to classifying the known customer into the at least one segment based on identifying at least one attribute of the unknown customer;
d) generating a state transition model as a regression tree based on a plurality of the known customers and an optimum policy in the state transition model to maximize a reward from the unknown customer and supplying the second set of training data to step a;
executing the state transition model by steps e through g
e) estimating, using the state transition model, the trained estimation model, and the optimal policy, the at least one segment of the unknown customer on a basis of the attribute of the known customer and a type of a relation between the known customer and the unknown customer to calculate a probability that the unknown customer belongs to each of a plurality of segments, and updating the probability that the unknown customer belongs to each of the plurality of segments after a type of sales communication is performed on the unknown customer and repeating the estimating until the reward is above a settable reward threshold or the probability that the unknown customer belongs to one of the plurality of segments is above a settable probability threshold;
f) determining, based on the trained estimation model, and the optimum policy and according to a probability that the unknown customer belongs to each of the plurality of segments, a type of sales communication to be performed on the unknown customer by the sales representative, wherein the type of sales communication to be performed on the unknown customer by the sales representative is one of face-to-face sales activities, sales activities by telephone, and commodity introduction by mail; and
g) outputting a processing result of the at least one segment of the unknown customer obtained from the step e and the type of sales communication on the unknown customer obtained from the determining.

13. The non-transitory computer program product according to claim 12, further comprising:
acquiring, as the attributes of the other known customers, segments into which the other known customers should be classified among a plurality of segments, and
training the estimation model for estimating a segment into which the unknown customer should be classified.

* * * * *